(12) United States Patent
Gut

(10) Patent No.: US 11,701,997 B2
(45) Date of Patent: Jul. 18, 2023

(54) METHOD FOR ELIMINATING GLARE FROM OBJECTS BY MEANS OF A HEADLAMP SYSTEM OF A MOTOR VEHICLE

(71) Applicant: MERCEDES-BENZ GROUP AG, Stuttgart (DE)

(72) Inventor: Carsten Gut, Korb (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/636,413

(22) PCT Filed: Jul. 29, 2020

(86) PCT No.: PCT/EP2020/071438
§ 371 (c)(1),
(2) Date: Feb. 18, 2022

(87) PCT Pub. No.: WO2021/032432
PCT Pub. Date: Feb. 25, 2021

(65) Prior Publication Data
US 2022/0281377 A1 Sep. 8, 2022

(30) Foreign Application Priority Data
Aug. 21, 2019 (DE) .................... 10 2019 005 898.4

(51) Int. Cl.
*B60Q 1/08* (2006.01)
(52) U.S. Cl.
CPC ........ *B60Q 1/085* (2013.01); *B60Q 2300/056* (2013.01); *B60Q 2300/45* (2013.01)

(58) Field of Classification Search
CPC ............... B60Q 1/143; B60Q 2300/45; B60Q 2300/056; B60Q 1/085
See application file for complete search history.

(56) References Cited

U.S. PATENT DOCUMENTS

| 8,723,948 B2 | 5/2014 | Götz et al. |
| 8,862,336 B2 | 10/2014 | Dierks et al. |

(Continued)

FOREIGN PATENT DOCUMENTS

| DE | 102007040042 A1 | 2/2009 |
| DE | 102012210467 A1 | 12/2013 |

(Continued)

OTHER PUBLICATIONS

International Search Report dated Oct. 26, 2020 in related/corresponding International Application No. PCT/EP2020/071438.

(Continued)

*Primary Examiner* — Robert J May
(74) *Attorney, Agent, or Firm* — Patent Portfolio Builders PLLC

(57) ABSTRACT

A method for eliminating glare from objects using a headlamp system of a motor vehicle involves determining the positions of at least two objects reflecting from a headlamp of the headlamp system in a camera image produced by a camera of the headlamp system pointing at the area in front of the motor vehicle. The light emitted by the headlamp is dimmed in sections and the area in front is illuminated in such a way that the at least two objects and one region of the area in front, which is represented in the camera image by a connecting image section that connects the at least two objects to one another, are illuminated with reduced light intensity, so that less light is reflected back.

9 Claims, 1 Drawing Sheet

(56) References Cited

U.S. PATENT DOCUMENTS

| | | | |
|---|---|---|---|
| 9,013,058 B2* | 4/2015 | Watanabe | B60Q 1/085 307/10.8 |
| 9,663,023 B2 | 5/2017 | Strolz et al. | |
| 2005/0152581 A1* | 7/2005 | Hoki | G06V 20/56 382/104 |
| 2006/0146552 A1* | 7/2006 | Shaffer | B60Q 1/085 362/465 |
| 2008/0231195 A1* | 9/2008 | Kobayashi | B60Q 1/085 315/82 |

FOREIGN PATENT DOCUMENTS

| | | |
|---|---|---|
| DE | 102014110628 A1 | 1/2016 |
| DE | 102014216545 A1 | 2/2016 |
| DE | 102015016375 A1 | 6/2017 |
| DE | 202017102056 U1 | 7/2018 |
| EP | 2508392 A1 | 10/2012 |
| EP | 3135536 A1 | 3/2017 |
| EP | 2501584 B1 | 5/2019 |
| WO | 2009112910 A1 | 9/2009 |

OTHER PUBLICATIONS

Office Action created Jun. 3, 2020 in related/corresponding DE Application No. 10 2019 005 898.4.
Written Opinion dated Oct. 26, 2020 in related/corresponding International Application No. PCT/EP2020/071438.

* cited by examiner

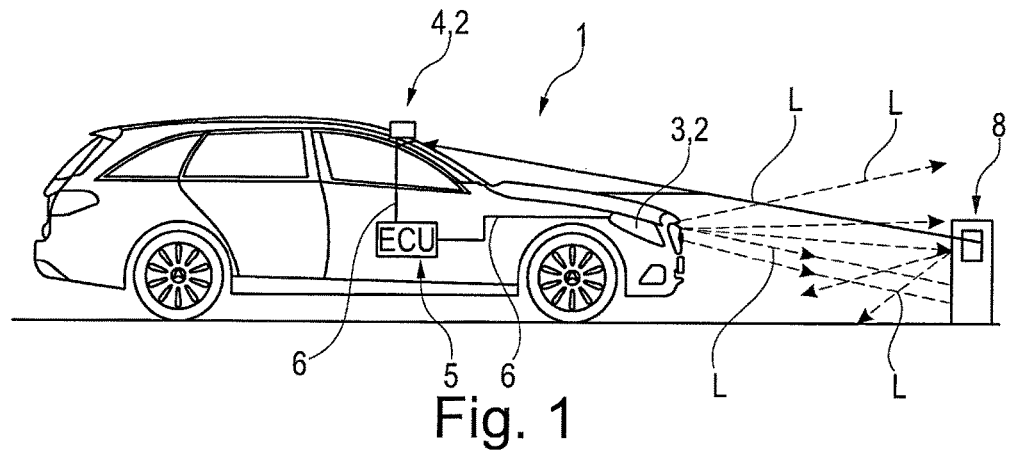
Fig. 1
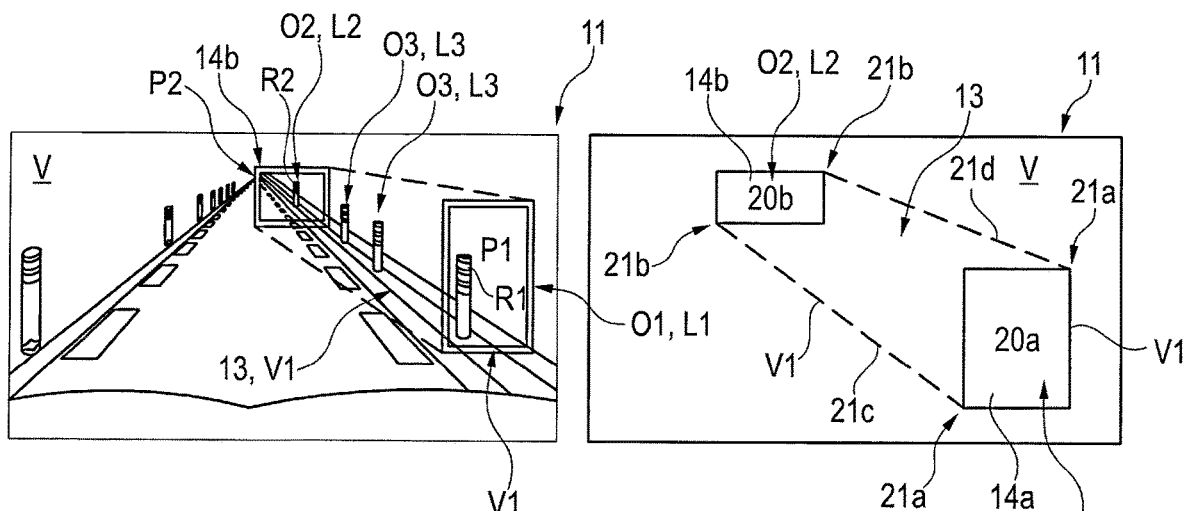
Fig. 2a
Fig. 2b
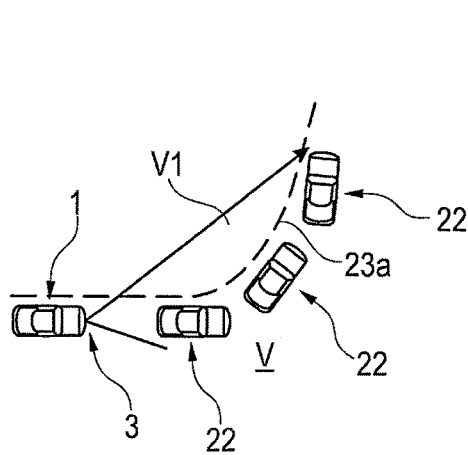
Fig. 3a
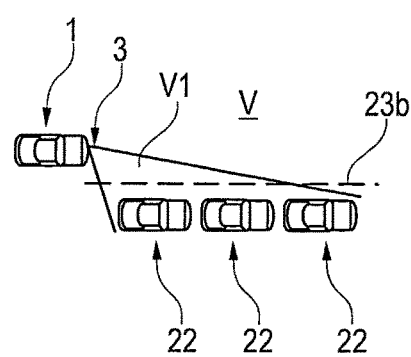
Fig. 3b

METHOD FOR ELIMINATING GLARE FROM OBJECTS BY MEANS OF A HEADLAMP SYSTEM OF A MOTOR VEHICLE

BACKGROUND AND SUMMARY OF THE INVENTION

Exemplary embodiments of the invention relate to a method for eliminating glare from objects by means of a headlamp system of a motor vehicle, as well as to a motor vehicle having a control/regulating device configured/programmed to carry out this method.

Modern motor vehicles are often equipped with powerful headlamps comprising light-emitting diodes (LEDs), for example, and which therefore emit light with a greater light intensity than was known from headlamps of an older design.

Often, the light emitted from modern headlamps is so bright that it is reflected by objects with reflective surfaces such as road signs or reflector posts, for example, and subsequently blinds the driver of the motor vehicle. It is therefore known from the prior art to manipulate the light emitted from the headlamp in such a way that the reflection of the light emitted from the headlamp by the reflective object is at least reduced. Such a procedure will be referred to in the following as "eliminating glare" from the respective object.

DE 10 2012 210 467 A1, for example, describes such a method. In the method therein, an image of the illuminated surroundings of the vehicle is determined and it is established whether a traffic sign is present in the surroundings of the vehicle. If there is, the position of the traffic sign is determined and the light emitted by the illumination device of the vehicle in the direction of the identified position of the traffic sign is modified such that the reflection of the light emitted by the illumination device by the traffic sign is reduced.

A similar method, in which a high-resolution headlamp of a motor vehicle is controlled in such a way that glare is eliminated from objects identified in the surroundings of the motor vehicle, is known from DE 10 2015 016 375 A1.

Exemplary embodiments of the present invention are directed to new approaches when developing methods for eliminating glare from objects illuminated with light from a headlamp of a motor vehicle and which produce light back by way of reflection. In particular, an improved method for eliminating glare is to be provided, in which the headlamp can easily be controlled such that only small amounts of control data have to be transmitted to the headlamp in order to control it.

The basic idea of the invention is therefore not to separately determine all of the objects reflecting light back in the area in front of a motor vehicle that is illuminated by a high-resolution headlamp, and to reduce the illumination thereof by controlling the headlamp accordingly, such that these objects reflect back less interfering light. Instead, it is proposed that in a camera image of the area in front only two objects reflecting back light be identified by means of an image analysis of this camera image. In a further method step, glare is eliminated by way of a corresponding control of the headlamp not only from the two regions of the area in front of the vehicle that correspond in the camera image to the position of the two identified objects; according to the invention in addition thereto glare is also eliminated from a region of the area in front of the vehicle corresponding in the camera image to an image section connecting the two previously described image sections to one another. This image section is referred to in the following as the "connecting image section" or "connecting region".

This exploits the fact that there are often also other objects reflecting back light that are located in this connecting region between the two identified objects. This is the case for example with reflector posts and road signs that line the sides of the road section along which the motor vehicle is travelling. The same applies to motor vehicles parked one behind the other at the side of the road. In a camera image of the area in front of the vehicle, which is produced by a camera provided in the motor vehicle, the objects are frequently located one after the other on a straight or curved connecting line.

Thus, to effectively eliminate glare using the method according to the invention it is sufficient to only determine, by means of image recognition, the positions of the two outer objects located on the connecting line and as a consequence of this to control the headlamp such that in the camera image glare is eliminated not only from the two explicitly determined objects but also from the connecting image section or connecting region between these two objects. Separately controlling the headlamp in order to eliminate glare from all (intermediate) objects on the connecting line is therefore unnecessary. This approach considerably simplifies the control for reducing, in sections, the emitted light intensity or quantity of light of the headlamp.

In particular, to control the headlamp only reduced amounts of data need to be transmitted in order to control the headlamp for reducing, in sections, the light intensity or quantity of light. Thus, camera systems and headlamps that can be controlled by a control/regulating device provided in the motor vehicle with relatively low, upwardly limited data transmission rates can also be used.

A method according to the invention for eliminating glare from objects by means of a headlamp system of a motor vehicle comprises two steps, a) and b). According to a first step a), the positions of two objects reflecting light from a headlamp of the headlamp system are determined in a camera image. The camera image is produced by a camera of the headlamp system pointing at the area in front of the motor vehicle and is a depiction of the area in front. According to a second step b), the light emitted by the headlamp and illuminating the area in front is dimmed, at least in sections, in such a way that the two objects and one region of the area in front, which is represented in the camera image by a connecting image section that connects the two objects to one another, are illuminated with reduced light intensity. As a result, less light is reflected back from the two objects—and from any objects located in the connecting image section. In this way, the desired glare elimination is achieved, without glare having to be eliminated from all objects separately by way of corresponding headlamp controls.

According to a preferred embodiment, in the course of step a) an image section of the camera image assigned to a respective object is assigned for each position of the two objects determined, in which image section the relevant object is located in the camera image. In this way, at least one first and one second image section are defined.

Based on the first and second image sections it is expedient to define a connecting image section connecting these two image sections, such that in step b) at least one region of the area in front of the motor vehicle, which corresponds in the camera image to the two image sections and the connecting image section, is illuminated with reduced light intensity. The additional determination of further objects in the camera image from which glare is to be eliminated, which is time-intensive both in terms of data and calculations, is thereby unnecessary. This considerably simplifies the practical implementation of glare elimination. In particular, the amount of data necessary for the control/regulating device to communicate with the headlamp is significantly reduced.

Particularly preferably, the two image sections—hereinafter referred to as the "first image section" and the "second image section"—each have the geometry of a rectangle. The connecting image section is formed by the two rectangular image sections and by two connecting lines, each of which connects a corner of the first rectangular image section to a corner of the second rectangular image section.

According to an advantageous embodiment, the position of at least one third object, preferably of a plurality of third objects, which is/are located in the camera image between the first and second objects is additionally determined in step a). In this embodiment, the connecting image section between the first and second objects is defined in such a way that it includes the at least one third object. In this way, separately controlling the headlamp in such a way that glare is also eliminated from the at least one third object is not necessary.

According to another advantageous embodiment, the distance to the headlamp from an object from which glare is to be eliminated is determined for each position of the object identified in the camera image. In this embodiment, the light intensity with which light is emitted by the headlamp is reduced in such a way that in the case of objects at a greater distance from the headlamp the light intensity is reduced less than in the case of objects at a smaller distance from the headlamp. In this way, it is possible to achieve a homogenous elimination of glare from objects located at different distances from the headlamp at the time it is dimmed.

Particularly preferably, the position of the at least two objects can be determined by means of reflective radar beams. The radar beams allow the aforementioned determination of the distance between the motor vehicle and the object from which glare is to be eliminated to take place particularly accurately.

According to an advantageous embodiment, a degree of dimming of the light emitted by the headlamp is varied or adjusted iteratively for each object by means of a control loop. In this way, glare from the individual objects can be eliminated in an optimal manner, such that, in particular, a camera image with homogenous brightness distribution is achieved, and therefore also an illumination of the area in front of the motor vehicle, wherein glare is eliminated from as many objects with reflective properties in the area in front of the vehicle as possible.

According to a further advantageous embodiment, the headlamp comprises at least one high-resolution light-generating region and at least one low-resolution light-generating region. For cost reasons, many headlamps installed in motor vehicles are configured in such a way that not all light-generating regions are high-resolution. Since the method presented herein can only be implemented by controlling a high-resolution light-generating region, it is proposed according to this embodiment that the dimming of the light emitted by the headlamp, which is essential to the invention, be restricted to the at least one high-resolution region thereof.

A "high-resolution headlamp" is to be understood in this context to be any headlamp having at least one high-resolution light-generating region.

It is expedient if at least one object is a road user, preferably another vehicle or motor vehicle, or a road sign or a reflector post or a reflector provided preferably at the side of the road, most preferably on crash barriers.

The invention also relates to a motor vehicle having a headlamp system comprising at least one high-resolution headlamp for illuminating the area in front of the motor vehicle and a camera for capturing the area in front. Moreover, the motor vehicle comprises a control/regulating device interacting with the headlamp system, which is configured/programmed to carry out the method according to the invention as described above. The advantages of the method according to the invention, which are also described above, therefore also apply to the motor vehicle according to the invention.

Further key features and advantages of the invention are set out in the drawings and the accompanying description of the drawings.

It goes without saying that the features mentioned above as well as those still to be described in the following can be used not only in the combination mentioned but also in other combinations or alone, without departing from the scope of the present invention.

Preferred embodiment examples of the invention are shown in the drawings and will be described in more detail in the description below, wherein identical reference numbers refer to identical or similar or functionally identical components.

BRIEF DESCRIPTION OF THE DRAWING FIGURES

In the drawings,

FIG. 1 schematically shows in a side view an example of a motor vehicle according to the invention with an object in the form of a reflector post, which is reflecting back light, FIG. 2a schematically shows an example of a camera image produced in the course of the method according to the invention, in which a plurality of objects, in the form of reflector posts and which are reflecting back light, can be seen, FIG. 2b schematically shows an abstract depiction of the camera image in FIG. 2a, in which objects shown in FIG. 2a are shown considerably simplified in the form of rectangular image sections, FIG. 3a schematically shows an application example of the method according to the invention, in which glare from vehicles parked one behind the other along a curved trajectory is eliminated, FIG. 3b schematically shows an application example of the method according to the invention, in which glare from vehicles parked one behind the other along a straight trajectory is eliminated.

DETAILED DESCRIPTION

FIG. 1 illustrates by way of example a motor vehicle 1 according to the invention. The motor vehicle 1 comprises a headlamp system 2 comprising at least one headlamp 3 for illuminating an area in front V of the motor vehicle 1 and a camera 4 for capturing the area in front V of the motor vehicle. Furthermore, the motor vehicle 1 comprises a control/regulating device 5 interacting with the camera 4, which is configured/programmed to carry out the method according to the invention. For this, the invention is in communication with both the headlamp 3 and the camera 4 via a fieldbus 6, for example a CAN or LIN bus. The headlamp 3 is a high-resolution headlamp having at least 5,000 pixels, for example, which can be controlled separately or independently of one another at least in sections by the control/regulating device 5. This is necessary in order to be able to carry out the method according to the invention, which is explained in the following on the basis of an example.

The method according to the invention serves to eliminate glare from objects 8 by means of the headlamp system 2. The object from which glare is to be eliminated may be, in particular, another road user, preferably another (motor) vehicle. The object may, however, also be a road sign or a reflector post. The object from which glare is to be eliminated may be, in particular, a reflector provided at the side of a road such as on crash barriers or reflector posts. In the course of carrying out the method, glare from two or more objects is eliminated, wherein it is also possible to eliminate glare from various different objects.

The method performed by the control/regulating device 5 comprises two steps, a) and b). According to a first step a), the two positions P1, P2 of the two objects O1, O2, which reflect light L from the headlamp 3 and which therefore reflect back light, are determined in a camera image 11 shown in FIG. 2a, which is produced by the camera 4 pointing at the area in front V of the motor vehicle 1. This reflected light may be perceived as interfering or at least unpleasant by the driver of the motor vehicle 1 when they are looking at the area in front V of the vehicle. In extreme cases, the reflected light can even blind the driver such that their ability to safely control the motor vehicle 1 is impaired.

In the example in FIG. 2a, the two objects O1, O2 are reflector posts L1, L2 each of which has a reflector R1, R2 reflecting light L. The object O1 and the reflector post L1 will be referred to in the following as the "first object" and "first reflector post" L1 respectively. The object O2 and the reflector post L2 will be referred to in the following as the "second object" and "second reflector post" respectively.

As is shown by FIG. 2a, in step a) the positions P3 of a plurality of third objects O3 that reflect back light are additionally determined. In the example in FIG. 2a, these objects O3 are also reflector posts L3 each having reflectors R3. These reflector posts L3 are arranged between the two reflector posts L1 and L2 as part of the road boundary and are therefore also present in the camera image 11 between the first and second reflector posts L1, L2, i.e., between the first and second objects O1, O2. In the course of the method, a connecting image section 13 between the first and second objects O1, O2 is now defined in the camera image 11, in which the third objects O3 are also included.

According to a second step b), the light L emitted by the headlamp 2 is dimmed, in sections, in such a way that the two objects O1, O2 or reflector posts L1, L2 and one region X of the area in front V of the vehicle, which is represented in the camera image 11 as a connecting image section 13, are illuminated with reduced light intensity. Thus, less light is reflected back from the two objects O1, O2 or the two reflector posts L1, L2 and also from the objects O3 or reflector posts L3.

According to FIG. 2b, in the course of step a) an image section 14a, 14b of the camera image 11 assigned to the respective object O1 or O2 is defined for each position P1, P2 of the two reflective objects O1, O2 determined, in which image section the relevant object O1, O2 is located in the camera image 11. In this way, the first image section 14a and the second image section 14b are defined. Moreover, according to FIG. 2b, based on the first and second image sections 14a, 14b a connecting image section 13 connecting these two image sections 14a, 14b to one another is determined or defined.

In the example in FIG. 2a, 2b, the two image sections 14a, 14b each have the geometry of a rectangle with corners 21c (image section 14a) and 21b (image section 14b). As illustrated in FIG. 2a, 2b, the connecting image section 13 is delimited by the two rectangular image sections 14a, 14b and by two connecting lines 21c, 21d, each of which connects a corner 21a of the first rectangular image section 14a to a corner 21b of the second rectangular image section 14b.

For the purpose of eliminating glare, according to step b) at least one region V1 (cf. FIG. 2a, 2b) of the area in front V of the motor vehicle, which corresponds in the camera image 22 to the two image sections 14a, 14b and the connecting image section 13, is illuminated with reduced light intensity.

In a further embodiment of the example, the distance to the headlamp 3 can be determined for each position P1, P2, P3 identified in the camera image 11 of a reflective object O1, O2, O3. In this way, a distance-dependent reduction in light intensity of the light L emitted by the headlamp 3 and which hits the respective object O1, O2, O3 can be implemented. Preferably, in the case of objects O1, O2, O3 at a greater distance from the headlamp 3 the light intensity L will be reduced less than in the case of objects O1, O2, O3 at a smaller distance from the headlamp; the reason for this is that in the case of objects at a smaller distance, the glare effect caused by reflection is greater, so that a greater degree of glare elimination is required than in the case of objects at a greater distance.

The method presented above can be applied not just to objects O1, O2, O3 in the form of reflector posts L1, L2, L3 but also to other objects such as road signs, for example. It is also conceivable that it can be applied to objects in the form of other road users such as other motor vehicles, for example. This is expedient since particularly the bodywork of motor vehicles can have high reflectivity.

FIGS. 3a and 3b show two possible application variants of the method on other motor vehicles 22 reflecting back light. For instance, it is conceivable that—as shown in FIG. 3a—a plurality of such motor vehicles 22 are parked one behind the other along a curved trajectory 23a. If the parked vehicles 22 are located in the area in front V of the motor vehicle 1, glare can be eliminated from the region V1 of the area in front V with the vehicles 22 with the help of the method according to the invention.

FIG. 3b shows a variant of the example in FIG. 3a. The example in FIG. 3b differs from that in FIG. 3a in that in the example in FIG. 3b the motor vehicles 22 are not parked one behind the other along a curved trajectory 23a but along a straight trajectory 23b.

In a further variant, which can be combined with all of the examples described above, the position of the objects O1, O2, O3 from which glare is to be eliminated is not determined by way of the camera image 11 but rather by way of reflective radar beams. For this, a radar system known to the person skilled in the art as "LIDAR", can, for example, be used.

A particularly good glare-elimination result is achieved when a degree of dimming of the light L emitted by the headlamp 3 is controlled for each object O1, O2, O3 by means of a control loop. Such a control loop can be implemented iteratively by the control/regulating device 5.

In practice, headlamps 3 that are not entirely high-resolution, but rather are only high-resolution in sections are often installed in motor vehicles in series. Such a headlamp 3 therefore has at least one high-resolution light-generating region and at least one light-generating region having a lower resolution than the high-resolution region—this region having a lower resolution will be referred to in the following as the "low-resolution region". Such a headlamp 3 is less expensive to manufacture than a headlamp having only high-resolution regions. The high-resolution region differs from the low-resolution region in a higher pixel count per unit area.

If such a headlamp 3 having at least one high-resolution region and at least one low-resolution region is now used, it is expedient if the method according to the invention is only used when the desired glare elimination of the area in front V takes place in a region V1 of the area in front V that is illuminated by means of the high-resolution region. Otherwise, i.e., if the illumination of the region V1 is only possible by means of the low-resolution region, the resolution required for eliminating glare from the region V1 as desired cannot be achieved. It is expedient if the dimming, i.e., the reduction in light intensity or quantity of light of the light L emitted by the headlamp 3, is restricted to the high-resolution region of the headlamp 3. This also applies, of course, to headlamps having two or more high-resolution light-generating regions as well as—alternatively or additionally thereto—headlamps having two or more low-resolution light-generating regions.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for eliminating glare from objects by using a headlamp system of a motor vehicle, the method comprising:
   a) determining positions of two objects, which reflect light emitted by a headlamp of the headlamp system, in a camera image produced by a camera of the headlamp system pointing at an area in front of the motor vehicle;
   b) dimming, in sections, the light emitted by the headlamp and illuminating the area in front of the motor vehicle in such a way that the two objects and one region of the area in front of the motor vehicle, which is represented in the camera image by a connecting image section connecting the at least two objects to one another, are illuminated with reduced light intensity so that less light is reflected back from the at least two objects; and
   determining, for each of the determined positions of the two objects, a distance between the headlamp and a respective determined position of one of the two objects,
   wherein a light intensity with which light is emitted from the headlamp is reduced less when the determined distance is a greater distance from the headlamp than when the determined distance from the headlamp is smaller.

2. The method of claim 1, wherein step a) comprises:
   identifying, based on the determined position of a first one of the two objects, a first image section of the camera image in which the first one of the two objects is located;
   identifying, based on the determined position of a second one of the two objects, a second image section of the camera image in which the second one of the two objects is located.

3. The method of claim 1, wherein
   in step a) the position of at least one third object is located in the camera image between the first and second objects, is also determined, and
   the connecting image section between the first and second objects is defined in such a way that it includes the at least one third object.

4. The method of claim 1, wherein the positions of the two objects is determined using reflective radar beams.

5. The method of claim 1, wherein a degree of dimming of the light emitted by the headlamp is controlled iteratively for each of the two objects using of a control loop.

6. The method of claim 1, wherein
   the headlamp has at least one high-resolution light-generating region and at least one low-resolution light-generating region, and
   the dimming of the light emitted by the headlamp is restricted to the at least one high-resolution region.

7. The method of claim 1, wherein at least one of the two objects is a different vehicle or motor vehicle, a road sign, a reflector post, or a reflector positioned on a side of the road.

8. A method for eliminating glare from objects by using a headlamp system of a motor vehicle, the method comprising:
   a) determining positions of two objects, which reflect light emitted by a headlamp of the headlamp system, in a camera image produced by a camera of the headlamp system pointing at an area in front of the motor vehicle;
   b) dimming, in sections, the light emitted by the headlamp and illuminating the area in front of the motor vehicle in such a way that the two objects and one region of the area in front of the motor vehicle, which is represented in the camera image by a connecting image section connecting the at least two objects to one another, are illuminated with reduced light intensity so that less light is reflected back from the at least two objects,
   wherein step a) comprises:
   identifying, based on the determined position of a first one of the two objects, a first image section of the camera image in which the first one of the two objects is located; and
   identifying, based on the determined position of a second one of the two objects, a second image section of the camera image in which the second one of the two objects is located, the method further comprising
   determining, using at least one line connecting the first and second image sections, a connecting image section connecting the first and second image sections to one another,
   wherein in step b) at least one region of the area in front of the motor vehicle, which corresponds in the camera image to the first and second image sections and the connecting image section, is illuminated with reduced light intensity.

9. A motor vehicle, comprising:

a headlamp system comprising a headlamp configured to illuminate an area in front of the motor vehicle, wherein the headlamp a high-resolution headlamp;

a camera configured to captured the area in front of the motor vehicle; and a control/regulating device coupled to and configured to control the headlamp system, wherein the control/regulating device is configured to
  a) determine positions of two objects, which reflect light emitted by a headlamp of the headlamp system, in a camera image produced by a camera of the headlamp system pointing at an area in front of the motor vehicle; and
  b) dim, in sections, the light emitted by the headlamp and illuminating the area in front of the motor vehicle in such a way that the two objects and one region of the area in front of the motor vehicle, which is represented in the camera image by a connecting image section connecting the at least two objects to one another, are illuminated with reduced light intensity so that less light is reflected back from the at least two objects, wherein the headlamp has at least one high-resolution light-generating region and at least one low-resolution light-generating region, and wherein the dimming of the light emitted by the headlamp is restricted to the at least one high-resolution region.

* * * * *